(12) United States Patent
Hince

(10) Patent No.: US 6,403,364 B1
(45) Date of Patent: Jun. 11, 2002

(54) METHOD FOR THE ENHANCED ANAEROBIC BIOREMEDIATION OF CONTAMINANTS IN AQUEOUS SEDIMENTS AND OTHER DIFFICULT ENVIRONMENTS

(75) Inventor: Eric Christian Hince, Campbell Hall, NY (US)

(73) Assignee: Geovation Consultants Inc., Florida, NY (US)

( * ) Notice: Subject to any disclaimer, the term of this patent is extended or adjusted under 35 U.S.C. 154(b) by 0 days.

(21) Appl. No.: 09/493,827

(22) Filed: Jan. 28, 2000

(51) Int. Cl.[7] ............................................. C12S 13/00
(52) U.S. Cl. ................... 435/262.5; 435/262; 210/610; 210/747
(58) Field of Search ............................ 435/262, 262.5, 435/179, 264; 71/8–11, 64.11; 210/610, 611, 747; 252/184; 424/468–470; 502/404, 518; 504/117

(56) References Cited

U.S. PATENT DOCUMENTS

| | | | |
|---|---|---|---|
| 3,242,055 A | * | 3/1966 | De Lucia |
| 4,006,056 A | * | 2/1977 | Weber |
| 4,385,121 A | * | 5/1983 | Knowlton |
| 5,264,018 A | | 11/1993 | Koenigsberg et al. |
| 5,275,943 A | * | 1/1994 | Di Turo |
| 5,279,740 A | * | 1/1994 | Basile et al. |
| 5,340,376 A | | 8/1994 | Cunningham |
| 5,348,803 A | * | 9/1994 | Schlaemus et al. |
| 5,395,808 A | | 3/1995 | Miller et al. |
| 5,397,755 A | | 3/1995 | Parker et al. |
| 5,403,809 A | | 4/1995 | Miller et al. |
| 5,425,881 A | | 6/1995 | Szejtli et al. |
| 5,567,324 A | | 10/1996 | Rothmel et al. |
| 5,595,893 A | * | 1/1997 | Pometto, III et al. |
| 5,618,427 A | * | 4/1997 | Seech et al. |
| 5,626,437 A | | 5/1997 | Hunt et al. |
| 5,679,364 A | | 10/1997 | Levy |
| 5,700,558 A | | 12/1997 | Bopp |
| 5,733,067 A | | 3/1998 | Hunt et al. |
| 5,786,188 A | | 7/1998 | Lamar et al. |
| 5,849,060 A | | 12/1998 | Diping et al. |
| 5,877,113 A | | 3/1999 | Mehta |
| 5,897,946 A | * | 4/1999 | Nachtman et al. |
| 5,908,267 A | | 6/1999 | Schuring et al. |
| 5,932,472 A | | 8/1999 | Abdullah |
| 5,939,086 A | | 8/1999 | Levy |
| 6,020,185 A | * | 2/2000 | Hince et al. |

FOREIGN PATENT DOCUMENTS

WO    WO-95/26944 A1  *  10/1995

OTHER PUBLICATIONS

Alcock Et Al., "The Influence of Multiple Sewage Sludge Amendments on PCB Content of an Agricultural Soil Over Time," Environmental Toxicology and Chemistry, 1995, pp 553–560, vol. 14, No. 4.

Gan and Berthouex, "Disappearance and Crop Uptake of PCBs from Sludge–Amended Farmland," Water Environmental Research, 1994, pp 54–60, vol. 66, No. 1.

Furukawa Et Al., "Biochemical Basis for the Degradation of Polychorinated Biphenyls in Soil Bacteria," in Pseudomonas: Molecular Biology and Biotechnology, Galli Et Al., Eds. 1992, pp 259–267, American Society for Microbiology, Washington, DC.

Aislabie Et Al., "Microbial Degradation of DDT and Its Residues—A Review," New Zealand Journal of Agricultural Research, 1997, pp 269–282, vol. 40.

Nadeau Et Al., "Aerobic Degradation of 1,1,1–Trichloro–2, 2–Bis(4–Chlorophenyl) Ethane (DDT) by *Alcaligenes eutrophus* A5," Applied and Environmental Microbiology, 1994, pp 51–55, vol. 6, No.1.

* cited by examiner

Primary Examiner—William H. Beisner

(57) ABSTRACT

The present invention discloses the formulation and use of advanced solid-media chemical compositions in the preferred forms of pellets, tablets, capsules, or other similar forms which are designed and intended to enhance the removal of a broad range of recalcitrant organic and inorganic contaminants from a variety of difficult-to-treat environments, in particular, sediments beneath water bodies, by providing an improved means of promoting the anaerobic, biologically mediated degradation, transformation, and/or detoxification of the contaminants. Specific properties of the pellet, tablets, capsules, or other similar forms of the compositions are disclosed which enable the variation in the settling velocity of the compositions and hence the depth to which the compositions will penetrate the underlying contaminated sediments. The compositions comprise carbonaceous co-substrates, inorganic and organic anaerobic electron acceptors, organic and inorganic nutrients to promote the growth of contaminant-degrading microorganisms, and inoculum of naturally occurring microorganisms which act to promote the biodegradation of contaminants.

5 Claims, 5 Drawing Sheets

Effects of Pellets on DO, Eh, and pH

METHOD FOR THE ENHANCED ANAEROBIC BIOREMEDIATION OF CONTAMINANTS IN AQUEOUS SEDIMENTS AND OTHER DIFFICULT ENVIRONMENTS

CROSS-REFERENCE TO RELATED APPLICATIONS

This invention can be used in conjunction with the liquid- and solid-chemical compositions for anaerobic bioremediation and the means and methods for anaerobic bioremediation disclosed in the pending application of Hince et al., Ser. No. 08/862,782, filed on May 23, 1997, now U.S. Pat. No. 6,020,185. This invention is particularly well suited for use in conjunction with the solid-chemical compositions disclosed in the recent patent applications filed by Hince (Ser. No. 09/439,698, Nov. 15, 1999), Hince and Singer (Ser. No. 09/440,340, Nov. 15, 1999) and Hince and Singer (Ser. No. 09/441,484, Nov. 17,1999).

FIELD OF THE INVENTION

Chemical contamination of the environment associated with many different types of industrial activities conducted over the last two centuries is a well documented, world-wide problem. Common environmental contaminants include several different types and forms of petroleum hydrocarbons, halogenated organic compounds including solvents (e.g., tetra- and trichloroethene, methylene chloride), pesticides (e.g., DDT and toxaphene), polychlorinated biphenyls (PCBs), and heavy metals and other inorganic contaminants such as cyanides. The available toxicological data indicates that many of these contaminants, in particular many of the halogenated organic compounds, are either carcinogenic or potentially carcinogenic to both man and animals. In addition, the available environmental and ecological data have shown that many of these contaminants tend to persist in the environment for long time periods and, consequently, they tend to accumulate in the tissues of biological organisms up the food chain. The long-term stability and extremely slow degradation of many such environmental contaminants presents a substantial, long-term hazard to human health and the environment throughout the industrialized world. Hence, there has been and continues to be a great need for improved methods for the remediation of contamination in the environment.

This invention discloses the formulation, manufacture and use of advanced solid-media chemical compositions designed and intended to enhance the biologically mediated removal ad of recalcitrant contaminants from hazardous and industrial wastes, and contaminated environmental media such as soils, sediments, sludges, surface waters, and the like. In particular, this invention provides improved means for the clean-up of contaminated sediments present in environmental settings which are difficult (if not impossible) to treat, such as the contaminated sediments present beneath streams, rivers, lakes, ponds, oceans, estuaries, bays, harbors, canals, lagoons and the like.

DESCRIPTION OF PRIOR ART

Many of the so-called conventional methods for the remediation or clean-up of chemically contaminated wastes, waters, soils and sediments have generally involved either the physical removal of the contaminated media or the simple mass transfer of the contaminants from one media (e.g., soil) to another (e.g., air). In general, such physical-treatment technologies do not involve the chemically and/or biologically mediated breakdown, transformation or detoxification of the contaminants. One of the most common categories of physical environmental remediation technologies for the treatment of contaminated sediments located beneath rivers, streams, lakes, and the like is dredging followed by their disposal in a landfill, which can pose a potential long-term risk to the environment. Each of the physical-treatment technologies share the same disadvantage-i.e., they do not reduce the actual amount or toxicity of the chemical contaminants, but rather they simply move the contamination from one place to another or from one media to another.

Another well-known physical treatment process which involves the thermal treatment or incineration of the contaminated materials can be an effective albeit expensive means of breaking down the molecular structure of the contaminants into non-hazardous products. For example, high-temperature incineration is known to be effective for the treatment of materials containing pesticide's and PCBs. Thermal-treatment methods require the use of sophisticated and operation-and-maintenance-intensive equipment, the costs of which are passed on to industry in the form of expensive unit costs for soil treatment. In addition, because thermal-treatment processes are rarely, if ever, one-hundred-percent effective in the destruction of the contaminants, they can produce atmospheric emissions of contaminants or the toxic by-products of contaminants. For example, the incomplete incineration of PCBs can produce dioxins, which in turn are significantly more toxic than their "parent" PCB compounds.

A third category of environmental-remediation treatment technologies, bioremediation, involves the use of microorganisms to convert chemical compounds into innocuous or less harmful chemical compounds. Bioremediation technologies generally have lower costs associated with their use and implementation than do the competing physical technologies. Bioremediation technologies are also more adaptable to different types of contamination problems and variations in field conditions than are physical-treatment technologies.

The most promising bioremediation technologies provide the additional capability of treating contaminated media in-situ, i.e., in place without the need for ground-water pumping or soil excavation. Current trends in bioremediation technology indicate that the most technically feasible and commercially successful bioremediation technologies are those which utilize indigenous or "native" contaminant-degrading bacteria (CDB), fungi and other microorganisms which are naturally present in the contaminated media. The presence of CDB in many different types of environments has been extensively reported in the scientific literature. There is an extensive body of prior art literature and patents concerning various means of using both aerobic and anaerobic CDB (as well as engineered or cultured bacteria) to biodegrade organic contaminants in water, soil and industrial wastes. For example, it has been reported that native Alcaligenes spp., Pseudomonas spp., and Enterobacter spp. can degrade a number of pesticides and polychlorinated biphenyls (Nadeau et al., 1994, *Applied and Environmental Microbiology*; Aislabie et al., 1997, *New Zealand Journal of Agricultural Research*; Galli et al., 1992, *Pseudomonas: Molecular Biology and Biotechnology*). Given the significant advantages of using native microorganisms versus the need to introduce cultured or engineered microorganisms, methods which involve the use of artificially introduced microorganisms (e.g., U.S. Pat. No. 5,932,472) are declining in favor within both the scientific and engineering communities. Recent trends in the art and literature acknowledge a growing understanding of the use of anaerobic biological processes in the treatment of many different types of contaminants that are otherwise recalcitrant under aerobic conditions. In particular, trends in the art reflect a growing understanding of the need and importance of achieving and maintaining anaerobic conditions and other factors which favor the biologically mediated reduction, biodegradation, transformation and/or detoxification of recalcitrant organic and inorganic contaminants in the environment.

The current understanding reflected by the art is that the recalcitrant nature of many halogenated organic contaminants, polynuclear aromatic hydrocarbons (PAHs), other heavy (i.e., high-molecular weight) hydrocarbons, and the like is related to the hydrophobic nature and extremely low solubilities of the contaminants. Consequently, the "bioavailability" of these contaminants, i.e., their availability to biological degradation processes mediated by microorganisms, is extremely limited under most environmental conditions. The prior art describes the use of chemical methods (e.g., Szejtli, et al., U.S. Pat. No. 5,425,881) and thermal methods (e g., Rothmel, et al., U.S. Pat. No. 5,567,324) to increase bioavailability. For a number of chemically complex hydrophobic chlorinated organic compounds, such as pesticides and PCBs, the prior art has suggested that the higher molecular weight (i.e., more chlorinated) compounds can not be practically biodegraded and thus bioremediation techniques have been all but abandoned with respect to the treatment of such compounds in the environment. For example, through laboratory and pilot-scale experiments directed at the investigation of bioremediation processes on Hudson River sediments contaminated with PCBs, General Electric (GE) researchers determined that the PCBs associated with the sediments consisted of both a labile (i.e., biologically usable) fraction and a resistant (i.e., refractory or relatively non-biologically usable) fraction (General Electric Company, 1992). The labile fraction was described by GE as the lower-molecular weight, less-chlorinated congeners that could be readily desorbed from the sediments. GE described the resistant fraction as the higher-molecular weight congeners that were adsorbed or otherwise bound to the natural organic matrix of the sediments thus greatly limiting their bioavailability to microorganisms. Inoculations with a purified PCB-degrading bacterial strain failed to improve the rate or extent of PCB reduction in the GE experiments. In addition, the GE study did not investigate any means or methods to try to increase the bioavailability of the most recalcitrant PCB congeners. Furthermore, the GE research failed to address or disclose methods or means involving the use of solid or liquid compositions to create and control optimal anaerobic conditions and Eh-pH conditions favorable to the biodegradation of the PCBs.

Alternatively, and in contrast to the present invention, further studies along the lines of GE's prior work have all but given up on the biodegradation of the resistant PCB congeners and have instead focused on the potential reduction of the environmental risks posed by these congeners via the long-term biostabilization of these congeners in the sediments (Gan and Berthouex, 1994; Alcock et al., 1995). These studies have further suggested that PCB biodegradation continues to occur slowly over an extended time frame as different PCB congeners become ;bioavailable (Gan and Berthouex, 1994; Alcock et al., 1995).

Many compositions, means and methods have been proposed in the prior art to facilitate the bioremediation of environmental contaminants. However, few compositions, methods or means have been disclosed for the in-situ bioremediation of contamination in "challenging" environments such: as contaminated sediments present beneath lagoons, lakes, rivers, streams, oceans and the like. Although a number of chemical compositions have been disclosed which are intended to promote the biodegradation of contaminants which may be present in such environments, few means or methods have been disclosed which provide these compositions in forms which can be practically, let alone reliably, applied to such environments.

U.S. Pat. No. 5,264,018 to Koenigsberg et al. (Plant Research Laboratories, Inc.) discloses a method of decontaminating soil by applying an oxygen delivery system comprised of a metal peroxide, ,fertilizer, surfactant, and metal in an amount which substantially increases the population of microorganisms in the soil that digests pollutants. The oxygen is liberated in a time-release fashion by controlling the decomposition of peroxide through "intercalation" with phosphate ion rather than by applying an exterior coating. The liberated oxygen can be carried to a further depth below the surface by the use of a surfactant. The composition may be applied in a liquid suspension or slurry form or as a dry application whereby oxygen release will commence once wetted. Koenigsberg et al. do not disclose the compositions of the present invention.

U.S. Pat. No. 5,849,060 to Diping et al. (Zhengzhou Centre for Popularization and Research on Zhengzhou Luxuriance) discloses a controlled-release fertilizer having water-soluble fertilizers as the nucleus and limited-soluble plant nutrient compounds as coating layers which serve to control the release rates of the fertilizer. The fertilizer is composed of nitrogen, phosphorus, potassium, magnesium, and trace elements. Diping et al. do not disclose the use of the fertilizer for uses or applications other than to promote the growth of plants, i.e., Diping et al. do not disclose the methods of the present invention, let alone any compositions or methods for the bioremediation of contaminants. Hence, Diping et al. clearly do not disclose the present invention.

U.S. Pat. No. 5,877,113 to Mehta (Organica, Inc.) discloses a solid-chemical composition for treating natural bodies of water comprising a quantity of beneficial aerobic microorganisms and a "growth accelerator" (i.e., source of carbon and nitrogen). The components are encapsulated inside a water soluble coating or formed into microcapsules. Mehta teaches the formation of the solid composition into various shapes having a weight of at least 85 g, preferably from 170 g to 1.5 kg in order to prevent the compositions from moving with the water to which it has been added. Mehta does not discuss the use of the solid composition for the treatment of sediments. Hence, Mehta does not disclose the present invention.

U.S. Pat. No. 5,340,376 to Cunningham (The Sierra Horticultural Products Company) discloses a controlled-release nutrient composition for supplying an effective microorganism growth- and activity-promoting level of nutrients. The formulation has a core of water soluble nutrients encapsulated in a release rate-controlling coating. Cunningham teaches the use of the composition for in- and ex-situ soil treatment and aqueous applications. This patent does not disclose the use of the composition for the treatment of contaminated sediment.

U.S. Pat. No. 5,908,267 to Schuring et al. (New Jersey Institute of Technology) disclose methods for the in-situ bioremediation of contaminants whereby a pressurized gas stream is injected into the soil which then creates fracture networks in the soil into which a variety of dry, granular media can be injected and deposited throughout the soil formation to enhance in-situ subsurface soil remediation. The dry media can include nutrients, microbial inoculum, agents to generate the desired pH, buffers, time-release nutritive substances, zero valent metals, and organic compounds. Schuring et al. do not disclose the application of the dry media to environments other than the artificial fracture networks created by the use of a pressurized gas stream. In addition, Schuring et al. do not disclose compositions or methods in which the use of the dry media are dependent upon their form or density. Accordingly, Schuring et al. do not disclose the present invention.

U.S. Pat. Nos. 5,679,364 and 5,939,086 to Levy (Lee County Mosquito Control District) disclose a contaminant-reducing agent delivery composition comprised of one or more superabsorbant solid organic polymers and at least one contaminant-reducing agent (i.e., film-forming agents, microbial agents, nutrient agents, and mixtures thereof). The disclosed contaminant-reducing composition is said to be of use for the reduction of contaminants on the surface of water bodies, e.g., waterways, lakes and the like. The composition may be combined into a time-released form prepared by encapsulating, agglomerating, or formulating mixtures into solids, dusts, granules, pellets, briquets, extrusions, laminates, or into composites. The controlled release can be modified or delayed by the degree of compaction, by varying the concentration of film-forming agents, by varying the concentration of polymers, or by adding one or more binders. The composition can also be placed into water-soluble or biodegradable packets, pouches, or capsules. Levy does not disclose the use of organic and inorganic amendments other than microorganisms and microbial nutrient agents. In addition, Levy is primarily focused on the application of the compositions to contaminant spills in surface-water bodies, and goes so far as to discuss and disclose the addition of buoyancy agents to prevent sinking of the compositions. Hence, U.S. Pat. Nos. 5,679,364 and 5,939,086 to Levy do not disclose the present invention.

U.S. Pat. No. 5,700,558 to Bopp discloses a material which serves as a biodegradable absorbent for oil or other hydrocarbon liquid spills comprised of granulated foam, microbial nutrients, "de-dust agents," and ground cellulosic material. Bopp also claims the formulation of the disclosed materials into a pellet form. Bopp does not disclose the application of the disclosed formulation to problems other than surface spills of contaminants, hence no means or methods are disclosed for the remediation of contaminated sediments associated with streams, rivers, lakes, lagoons or the like. In addition, Bopp does not disclose the use of inorganic amendments. Clearly, Bopp does not disclose the present invention.

U.S. Pat. Nos. 5,395,808 and 5,403,809 to Miller et al. (W.R. Grace and Co.) disclose different types of microporous bodies which are suitable for use as "inorganic supports" for bioremediation catalysts and bacteria. Such porous bodies are composed of mixtures of "ultimate particles" comprised of bound clay, inorganic binders, extrusion or forming aids, burnout agents and forming liquids. U.S. Pat. No. 5,403,809 (Miller et al.) discloses the addition of activated charcoal and zeolite to the porous body. Spaces between the ultimate particles become the pores in the finished bodies. Uses include biotreatment of aqueous waste streams, biofiltration of gases, bioorganic synthesis of fine and commodity chemicals, absorption of liquids, and carriers for reagents. U.S. Pat. Nos. 5,395,808 and 5,403,809 to Miller et al. (W.R. Grace and Co.) do not disclose the present invention.

U.S. Pat. No. 5,397,755 to Parker et al. (W.R. Grace and Co.) discloses "bioremediation support(s)" for enhancing the activity of microorganisms used in the biotreatment of aqueous waste streams or contaminated vapor. The disclosed supports are low-cost, low-density siliceous glassy material, preferably pumice, used in combination with at least one material having adsorptive properties or buffering capacity. The macroporosity of the pumice allows diffusion of nutrients throughout the body and propagation of bacteria within the pores. The disclosed low-density supports are useful as "floaters" for oil/organic spills on water bodies. Hence, Parker et al. clearly do not disclose the present invention.

U.S. Pat. Nos. 5,626,437 and 5,733,067 to Hunt et al. (Foremost Solutions, Inc.) disclose the use of porous walls or reactive sheets filled with porous spheres for the in-situ bioremediation of contaminated ground water and surface water. The first patent to Hunt et al. (U.S. Pat. No. 5,626,437) discloses the use of porous inorganic spheres, such as diatomaceous earth pellets, treated by inoculation with non-pathogenic microbes. The later patent (U.S. Pat. No. 5,733,067) discloses the use of reactive sheets inoculated with microbes, zero-valent metal, a leachable compound, and an adsorptive compound. No disclosures are made for the use of the support spheres for applications other than their incorporation into porous walls or reactive sheets. U.S. Pat. Nos. 5,626,437 and 5,733,067 to Hunt et al. do not disclose the present invention.

SUMMARY OF THE INVENTION

This invention discloses advanced solid-chemical compositions which are designed and intended to provide unique advantages for the anaerobic, biologically mediated removal of recalcitrant chemical contaminants from industrial wastes, soils, sediments, sludges, surface waters, and the like. Moreover, this invention provides specific advantages for the clean-up of chemical contaminants present in environments which are difficult (if not impossible) to treat using previously disclosed means or methods, including, but not limited to, streams, rivers, lakes, ponds, oceans, estuaries, bays, harbors, canals, lagoons, and the like. Contaminants which may be treated according to the means and methods of the present invention include, but are not limited to, petroleum hydrocarbon contaminants such as gasolines, fuel oils, lubricating oils, hydraulic oils, polycyclic aromatic hydrocarbons (PAHs), and the like; organochlorine pesticides such as DDT and toxaphene; arsenic and/or arsenate-based pesticides; polychldrinated biphenyls (PCBs); dioxins; halogenated organic solvents such as perchloroethylene, trichloroethylene, trichloroethane, and freon; and toxic inorganic contaminants such as cyanide, hexavalent chromium, and the oxidized forms of other toxic heavy metals. The chemical compositions of the present invention also provide significant technical advantages and cost savings when applied to the remediation of contaminated soils, ground waters, and hazardous and industrial wastes.

In the preferred embodiments of the present invention, the solid-chemical compositions are prepared, manufactured and used in the forms of pellets, tablets, caplets, capsules, briquettes, bricks, blocks, cakes, or other similar forms which enable them to sink in bodies of water and also to penetrate into the underlying sediments. The present invention also discloses solid-chemical compositions which have variable, time-dependent rates of disintegration, disaggregation, dispersal, and dissolution subsequent to their introduction to a contaminated environment. The present invention further discloses compositions which provide components which have variable, time-dependent rates of biodegradation and biological conversion in the environment so as to optimize the treatment of contaminated media which have contaminants with varying environmental half-lives, degrees of recalcitrance and/or biogeochemical reactivity.

A basic albeit further advantage of the present invention is that the preferred forms of the disclosed solid-chemical compositions which are prepared and used as pellets, tablets, caplets, capsules, briquettes, bricks, blocks, cakes, or other similar forms are easier to store, handle, and use in a wide range of environmental-remediation applications than either other forms of the compositions or chemical compositions previously disclosed in the prior art. The present invention also compliments and is ideally suited for use in conjunction with the solid-chemical compositions for bioremediation of environmental contaminants disclosed in the pending applications filed by Hince (Ser. No. 09/439,698, Nov. 15, 1999), Hince and Singer (Ser. No. 09/440,340, Nov. 15, 1999), and Hince and Singer (Ser. No. 09/441,484, Nov. 17, 1999).

A further object of the invention is to present means by which to overcome the disadvantages associated with not only the traditional means and methods of remediation previously described but the limitations of other more recent and/or technically advanced methods and means of chemical-reduction based remediation and bioremediation described in the prior art. The present invention has the further advantage that it can be used effectively either ex-situ or in-situ. The preferred embodiment of the present invention offers the further advantage of providing a means of promoting the bioremediation of contaminated sediments in-situ beneath bodies of natural water such as oceans, lakes, rivers, streams, and the like, and man-made water bodies such as waste-treatment lagoons and the like. The present invention also discloses subtle improvements in the art which provide means of treating extremely recalcitrant chemical contaminants including but not limited to PCBs, dioxins, organochlorine pesticides and their daughter products, halogenated solvents, hexavalent chromium and other inorganic contaminants present in environmental media and man-made wastes. The present invention provides for significant cost savings relative to other means and methods for environmental remediation, as it can reduce or eliminate the need for dredging, excavation, pumpage, transportation, and/or off-site treatment of contaminated sediments, wastes, soil, or water.

These and other objects and advantages of the present invention will become apparent to those skilled in the art in the following detailed description of the invention which reveals the novel solid-chemical compositions described previously, which are more particularly defined in the appended claims.

BRIEF DESCRIPTION OF THE FIGURES

Embodiments of the present invention will now be described more fully with reference to the following drawings in which.

DETAILED DESCRIPTION OF THE INVENTION

Figure 1:
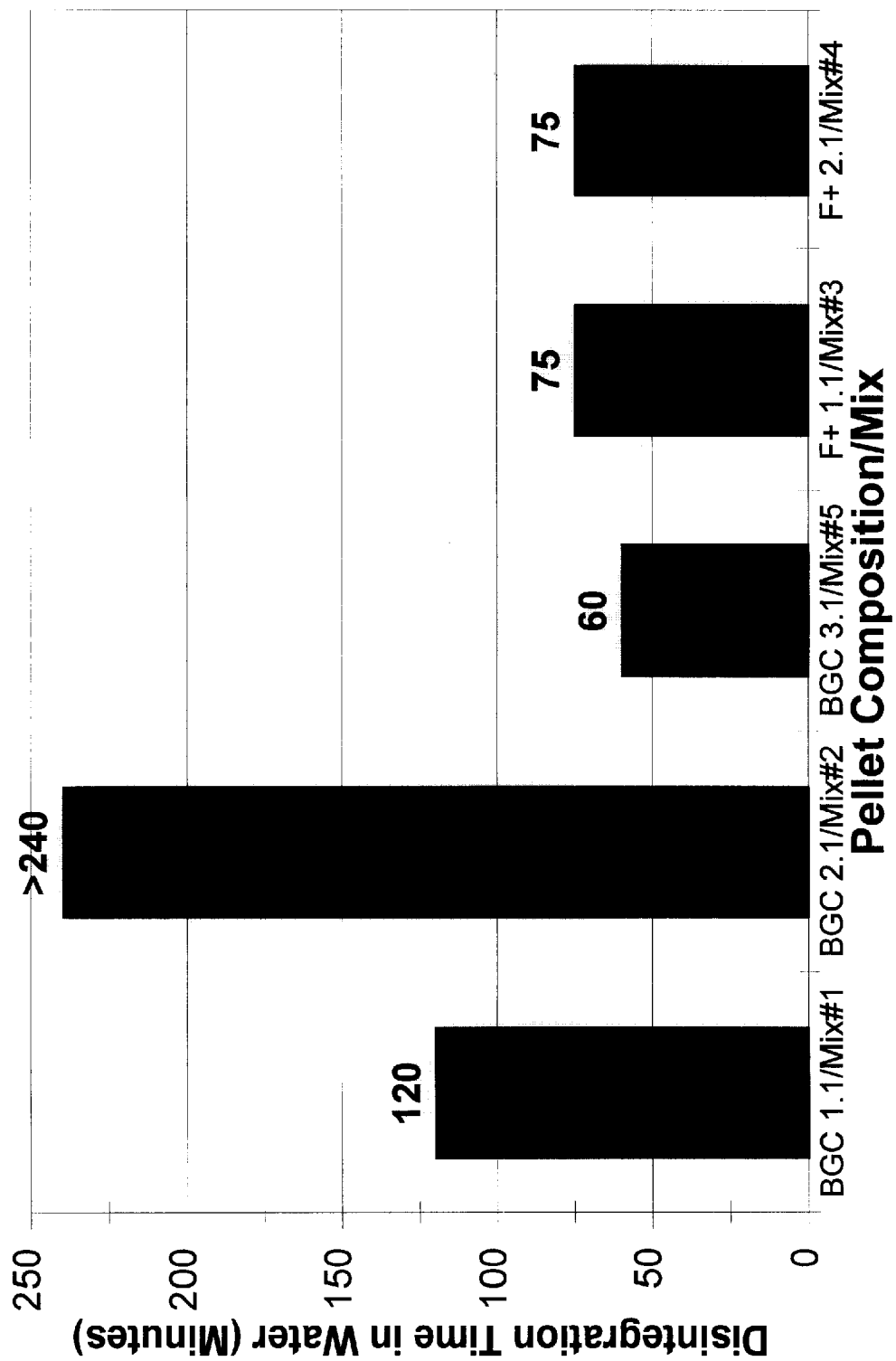
FIG. 1 shows the effects of both varying composition and manufacturing criteria on the time required for pelletized forms of chemical compositions prepared in accordance with both the present invention and those previously disclosed by Hince and Singer (Ser. No. 09/440,340, filed Nov. 15, 1999 and Ser. No. 091441,484, filed Nov. 17, 1999) to disintegrate in water.

The present invention discloses advanced solid-chemical compositions which contain one or more plant-derived, organic, and inorganic components which provide the capacity to extract and absorb hydrophobic organic and inorganic chemical contaminants from contaminated media such as wastes, soils, waters, sediments and the like; enhance the bioavailability and biogeochemical reactivity of said contaminants; create and maintain anaerobic and reducing conditions in said contaminated media; and promote the anaerobic biodegradation, detoxification, and/or transformation of said contaminants. Specifically, the present invention discloses such solid-chemical compositions wherein they are in the preferred forms of pellets, tablets, caplets, capsules, briquettes, bricks, blocks, cakes, or other similar forms whereby such forms of these compositions have properties which enable them to sink in water and penetrate the underlying contaminated sediments. This advantage of the present invention alone provides for significantly improved means of facilitating the in-situ remediation of contamination in difficult-to-treat environments such as the sediments beneath bodies of water such as streams, rivers, lakes, ponds, oceans, estuaries, bays, harbors, canals, lagoons, and the like. Specific properties of the pellet, tablet, caplet, capsule, briquette, brick, block, cake, and other similar forms of the compositions are disclosed which enable the variation of the settling velocities, of the compositions and hence the depth to which the compositions will penetrate the underlying contaminated sediments. These properties include a minimum specific gravity of 1.2, such that regardless of the other properties disclosed, the compositions will readily sink in water. Other properties which are disclosed to control the sinking and settling characteristics of the aforementioned preferred forms of the compositions include the use of different densities, sizes, shapes, coefficients of friction, and degrees of hardness of the various forms of the compositions. The variation of the aforementioned characteristics of the solid-chemical compositions in accordance with the present invention enables significant control over the degree and depth by which these compositions can penetrate contaminated sediments underlying water bodies. Hence, this advantage of the present invention provides specific, improved means of targeting the in-situ treatment of such sediments to various depth intervals.

The present invention also discloses solid-chemical compositions which provide for the variation of the time-dependent disintegration, disaggregation, dispersal, and dissolution of the preferred forms of pellets, tablets, caplets, capsules, briquettes, bricks, blocks, cakes, and the like at rates which range from five (5) minutes to ninety (90) days. This advantage of the present invention provides improved means of controlling the time-dependent interaction of the aforementioned forms of the solid-chemical compositions with the contaminated media in order to improve and optimize the treatment thereof. In essence, this aspect of the present invention uses the properties of the preferred forms of the compositions as a means of providing for a sustained-release of the various components of the compositions, which is similar in concept to the sustained-release functionality of many medicines. This advantage of the present invention is particularly important with respect to the in-situ bioremediation of heavy metals and relatively recalcitrant and/or hydrophobic organic contaminants, such as PCBs, pesticides, heavy hydrocarbons (e.g., PAHs), nitroaromatic compounds, halogenated solvents, and other substances which may require prolonged and/or sequential phases of treatment. The present invention further discloses that the time-dependent rates of disintegration, disaggregation, dispersal, and dissolution of the aforementioned preferred forms of the compositions can be varied as a function of their size, shape, hardness, degree of compaction, surface-area to volume ratio, the types and relative proportions of the soluble to insoluble components contained therein, the types and amounts of disintegrants contained therein, the types and amounts of sustained-release agents contained therein, the types and amounts of binding agents contained therein, and the types and amounts of surface-coating agents applied to the compositions.

The present invention also discloses additional means for controlling the time-dependent, sustained-released functionality of the compositions as a function of the time-dependent rates of biodegradation and biological and biogeochemical conversion of the various components contained in the compositions. The plant-derived, organic and inorganic components, and any portions thereof, have rates of biodegradation and biological and biogeochemical conversions which range from five (5) minutes to six-hundred (600) days upon exposure to water and the environment. This advantage of the present invention provides additional and complimentary means of controlling the time-dependent interaction of the disclosed solid-chemical compositions with the contaminated media in order to improve and optimize the treatment thereof. This advantage of the present invention is particularly important with respect to the in-situ bioremediation of relatively recalcitrant and/or hydrophobic organic contaminants, as well as for the bioremediation of media which contain high levels of contaminants. By providing compositions containing a mixture of fine-particulate cellulose and other plant-derived and organic materials which have a mean particle size of less than 200 microns in the composition (i.e., small particle size and resultant, increased surface-area to volume ratio) and larger mean-particle size materials, it is possible to "stagger" the time-dependent rates of biodegradation and biological and biogeochemical conversion of the components of the compositions in the contaminated environment. The small particle size materials (i.e., <200 microns in size) will exhibit an increased rate of biodegradation and biological and biogeochemical conversion due to their increased surface-area to volume ratio in comparison to the larger-sized particles. In addition, these small particle size plant-derived and organic materials provide the enhanced capacity to physically and/or biogeochemically extract hydrophobic contaminants from contaminated environmental media, which in turn makes the contaminants bioavailable to microorganisms. This combination of biodegradation and biological and bidgeochemical conversion rates allows for the larger-sized materials to be sustained for longer times in the contaminated environments, thus providing for the enhanced bioremediation of relatively recalcitrant and/or hydrophobic organic contaminants for a time after the initial application of the compositions to the contaminated environment. Thus, fewer applications of the compositions would most likely be required.

In addition to the use of both large and small particle-size components in the compositions and thus varying the surface-area to volume ratio as discussed above, the present invention further discloses that the time-dependent rates of biodegradation and biological and biogeochemical conversion of the components of the compositions can be controlled by varying one or more of the following properties including organic-carbon and/or organic-polymer content; the polymer-chain length of components which contain organic polymers; cellulose content; the types and amounts of labile organic materials relative to the types and amounts of refractory organic materials; electron-acceptor content; nutrient-nitrogen and phosphorus content; degree of fracturing and/or microfracturing of the internal structure of said components; solubility in and miscibility with water; solubility in and miscibility with oils, organic solvents and hydrophobic substances; porosity; bioavailability (with respect to microorganisms); the types and amounts of disintegrants contained in the overall composition; the types and amounts of sustained-release agents contained in the overall composition; and the types and amounts of binding and processing agents contained in the overall composition.

The solid-chemical compositions of the present invention also provide means for controlling the time-dependent consumption and exhaustion of dissolved oxygen (DO), the establishment of reducing Eh (i.e., redox potential) conditions, and the creation of a prolonged demand for relatively high energy anaerobic electron acceptors, such as oxygen and nitrate, within contaminated media. Hence, the use of the disclosed compositions can establish and maintain favorable Eh-pH conditions for the anaerobic, biologically-mediated biodegradation, transformation, and detoxification of recalcitrant contaminants.

Another advantage of the disclosed solid-chemical compositions is that they provide improved means of "redox cycling" through different biogeochemical processes such as denitrification, manganese-reduction, iron-reduction, sulfate reduction, and methanogenesis, which enables the more effective and complete biological treatment of contaminated media. The disclosed solid-chemical compositions are particularly well suited for use with the nitrate-containing chemical compositions previously disclosed by Hince et al. (Ser. No. 08/862,782) and the solid-chemical compositions previously disclosed by Hince and Singer (Ser. No. 09/440, 340 and Ser. No. 09/441,484) to facilitate such redox cycling and to optimize the advantages thereof. These advantages of the present invention are believed to enable the more effective and complete biological treatment of contaminated environmental media as they provide means of using a much broader range of biogeochemical processes to treat the contamination. Such advantages of the present invention are particularly important with respect to the treatment of environmental media impacted with high levels of contaminants and/or relatively recalcitrant contaminants (e.g., PCBs, pesticides, PAHs, and the like).

With respect to the preferred embodiment of the present invention, it is presumed that the solid-chemical compositions to be manufactured and/or used according to the means and methods disclosed herein have intrinsic properties which can create and maintain highly anaerobic and reducing conditions within the contaminated media being treated which are favorable to anaerobic bioremediation processes (e.g., denitrification, manganese-reduction, iron-reduction, sulfur/sulfate reduction, methanogenesis, and hydrolysis-hydrogenation processes). Hence, in the preferred embodiment of the present invention, the solid-chemical compositions to be manufactured and used according to the methods and means of the present invention should include various forms of electrons, organic and inorganic electron acceptors and nutrients, organic and inorganic substrates for microorganisms, as well as optional inorganic nutrient forms of nitrogen and phosphorus and chelating and acidifying agents.

Preferred formulations of the disclosed solid-chemical compositions of the present invention include one or more plant-derived materials, particularly in their fine particulate forms, which provide bioavailable and biogeochemically reactive sources of fibrous plant tissue, cellulose, organic carbon co-substrates, electron-acceptor forms of nitrogen, proteins, enzymes, other organic nutrient forms of nitrogen, fatty acids, phospholipids and other nutrient forms of phosphorus. In the preferred embodiment of the present invention, these plant-derived materials would comprise from 1 to 95% of the compositions by weight or volume and would be selected from the plant families Leguminosae, Phaeophyta, Gossypium, Cannabacea, Triticum, Aegilops, and combinations thereof. For logistical and practical reasons of material availability and cost, some or all of the plant-derived components of the compositions disclosed herein would be further selected from one or more of the group comprising Lespedeza spp., Medicago spp. (e.g., alfalfa), Vicia spp. (e.g., vetch), Glycine spp. (e.g., soy), Lathyrus spp. (e.g., indian vetch), Trifolium spp. (e.g., clovers), cotton, sargassum, hops, hemp, wheat, oats, rye, barley, and combinations of these materials. These plant materials provide the capacity to physically and/or biogeochemically extract hydrophobic contaminants from contaminated environmental media, which in turn makes the contaminants bioavailable to microorganisms. These materials also serve as both a substrate and source of inoculum for plant-fiber and cellulose degrading microorganisms, which as recently disclosed by Hince and Singer (Ser. No. 09/440,340, Nov. 15, 1999) and Hince and Singer (Ser. No. 09/441,484, Nov. 17, 1999), are believed to play an important role in the biodegradation of contaminants which become absorbed within and adsorbed to the plant-derived materials in the compositions.

Preferred formulations of the disclosed solid-chemical compositions of the present invention also include one or more sources of fine-particulate cellulose and other plant-derived and organic materials which have a mean-particle size of less than 200 microns comprising from 0.1 to 95% of the composition by weight or volume and one or more organic or plant-derived sources of water-soluble cellulose and cellulose-containing compounds comprising from 0.01 to 50% of the composition by weight or volume. Furthermore, from 0.1 to 100% of the fine-particulate cellulose and other plant-derived and organic materials would have a mean particle size of less th an 70 microns and from 1 to 100% of the fine-particulate cellulose and other plant-derived and organic materials would have a mean particle size of from 70 to 199 microns. In the preferred embodiment of the present invention, these fine-particulate cellulose, water-soluble cellulose and cellulose-containing compounds, and other plant-derived and organic materials would be selected from one or more of the group including microcrystalline cellulose, cellulose powder, sodium carboxymethyl cellulose (CMC), hydroxypropyl cellulose (HPC), hydroxypropyl methyl cellulose (HPMC), hydroxyethylcellulose (HEC), ethyl cellulose, cellulose nitrate, post-consumer processed paper, cardboard, fiberboard, particle board, plywood, wood, sawdust and other forms of cellulose and cellulose-containing materials; polyvinyl acetate, cellulose acetate and acetate-containing compounds; granular molasses, powdered molasses, extruded and co-extruded molasses, cane sugar, refined sugar, brown sugar, corn sugar and other sucrose- and fructose-containing materials; powdered barley malt extract and other grain extracts; plant and animal-derived proteins and enzymes; plant and animal-derived sources of lipids, phospholipids, glycerides and fatty acids; powdered starch, powdered pre-gelled starch and other plant- and animal-derived sources of starches and carbohydrates; and inoculum for denitrifying microorganisms, metal-reducing microorganisms, sulfur-reducing microorganisms, methanogenic and fermenting microorganisms, plant-fiber and cellulose-degrading microorganisms, soil microorganisms, legume-related microorganisms, and contaminant-degrading microorganisms.

The above-referenced organic materials, particularly in the fine particulate forms, are believed to enhance the bioavailability of hydrophobic contaminants in order to accelerate the rate at which the contaminants are degraded, transformed and detoxified via anaerobic, biologically mediated processes. For example, the soluble cellulosic compounds, such as sodium carboxymethyl cellulose (CMC), hydroxypropyl cellulose (HPC), hydroxypropyl methyl cellulose (HPMC), and the like, provide for the rapid deployment of a large surface area of cellulose within contaminated geologic media, which in turn promotes the rapid absorption and adsorption of hydrophobic contaminants, and hence, the more rapid biodegradation of such contaminants. The fine cellulose powders, microcrystalline cellulose and less soluble cellulose compounds, such as HEC, cellulose nitrate, and the like, provide similar benefits which are designed to occur over a longer time period. By combining the aforementioned materials with less soluble and/or larger particles of plant-derived materials and cellulosic substances in the preferred embodiments of the present invention, the formulation of the disclosed compositions provides an intrinsic means of promoting a time-dependent, sustained-release type interaction between the composition and the contaminated media. Specifically, by providing multiple sources of organic and plant-derived materials which have different rates of biodegradation and biological and biogeochemical reactivity, the disclosed compositions provide a more advanced and effective means of treating recalcitrant contaminants, mixtures of different types of contaminants, and complex contamination problems/scenarios in the environment.

Preferred formulations of the disclosed solid-chemical compositions of the present invention also include one or more inorganic nitrates being both electron acceptors for denitrifying bacteria and other anaerobic microorganisms capable of denitrification and an ammonium-free source of nitrates as the sole inorganic nutrient form of nitrogen comprising from 1 to 95% of the compositions by weight or volume selected from the group comprised of sodium nitrate, potassium nitrate, sodium-potassium nitrate, ferric nitrate, other soluble nitrate salts, minerals and soluble salts of nitrites, and nitrogen oxides. The preferred formulations also include one or more inorganic phosphates being sources of nutrient phosphorus for microorganisms and being surfactants comprising from 1 to 95% of the compositions by weight or volume selected from the group comprising disodium phosphate, diammonium phosphate, and other soluble orthophosphates; sodium hexametaphosphate, sodium trimetaphosphate, and other soluble and biologically hydrolyzable ringed polyphosphates; tetrasodium polyphosphate, sodium tripolyphosphate, and other soluble and biologically hydrolyzable linear polyphosphates; and surfactants.

Additional preferred embodiments of certain compositions disclosed herein also include one or more inorganic sources of electrons and electron acceptors (which are also inorganic substrates for metal-reducing and other anaerobic microorganisms), such as metallic iron and steel as well as minerals and compounds containing ferric iron; one or more inorganic sources of oxidative catalysts for the formation of metallic oxides, hydroxides, oxyhydroxides, sulfides and carbonates, such as metallic manganese and minerals and compounds containing manganese (IV). In the preferred embodiment of the present invention, the inorganic materials contained within the disclosed compositions comprise from 1 to 95% of the compositions by weight or volume.

Preferred formulations of the disclosed solid-chemical compositions of the present invention also include one or more chelating and acidifying agents which help promote anaerobic, biologically-mediated metal-reduction processes and other biogeochemical processes which are catalyzed by metals. In the preferred embodiment of the present invention, the chelating agents would comprise between 0.01 to 15% of the compositions by weight or volume and. would be selected from one or more of the following group: citric acid, formic acid, acetic acid, humic acid, fulvic acid, sodium citrate, nitrilotriacetic acid (NTA), and ethylenediaminetetraacetic acid (EDTA).

In addition, one or more disintegrants, sustained-release agents, coating agents, and binding or processing agents may be included in the preferred forms of the compositions, i.e., pellets, tablets, caplets, capsules, briquettes, bricks, blocks, cakes and the like.

The inclusion of disintegrants within the preferred forms of the compositions provides a number of advantages over the prior art, including the compositions recently disclosed by Hince and Singer (Ser. No. 09/440,340 and Ser. No. 09/441,484). First, the disintegrants enable these forms:to absorb water and break apart more quickly after being applied to contaminated environmental media, which improves their function and simplifies the procedures required to effectively use the compositions in the treatment of contaminated environmental media. Second, the disintegrants enable the aforementioned preferred forms of the compositions to be produced in more compact and harder forms without the loss of the aforementioned benefits, such that the compositions can sink faster in water and penetrate aqueous sediments more readily. The harder and more compact forms can also be more easily and robustly handled with mechanized equipment, and they produce less "nuisance" dust which is desirable from the perspective of enhancing the health and safety concerns of workers. In addition, the organic substances contained in the disintegrants are bioreactive and/or biodegradable, and provide similar and complimentary benefits to the other organic and plant-derived materials described above-i.e., the disintegrants also act to enhance the bioavailability and subsequent biodegradation, biotransformation, and detoxification of environmental contaminants. The disintegrants which would be used in the preferred embodiments of the disclosed compositions would comprise from 0 to 25% of the compositions by weight or volume and include one or more of the following: microcrystalline cellulose, cellulose powder, sodium carboxymethyl cellulose (CMC), hydroxypropyl cellulose (HPC), hydroxypropyl methyl cellulose (HPMC), starch, pre-gelled starch, sodium starch glycolate, crosscarmelose sodium, crospovidone, karaya gum, guar gum, locust-bean gum, and other plant- and animal-derived gums and other gel-forming materials.

The inclusion of binding agents and processing agents are designed to improve the quality of the preferred forms of the disclosed compositions as well as to enable a wider range of formulations than would otherwise be possible without the use of such agents. The binding and processing agents which would be included in the preferred embodiments of the disclosed chemical composition :s would comprise from 0.01 to 20% of the compositions by weight or volume and would include one or more of the following: wheat mids, soybean meal, whey, corn oil, soybean oil, lard, shortening, and other plant- and animal-derived fats and oils; karaya gum, guar gum, locust-bean gum, and other plant-derived gums; liquid and solid forms of molasses and cane sugar; chalk, calcium hydroxide, magnesium hydroxide, potassium hydroxide, and other silicate and hydroxide minerals; lime, limestone, and other forms of calcium carbonate; bone meal and calcium phosphate; siderite, rhodochrosite, and other carbonates; yellow boy, lepidicrosite, akagenitei, goethite, and other iron oxides, hydroxides, and oxyhydroxides.

The inclusion of sustained-release and coating agents within the preferred forms of the compositions, i.e., pellets, tablets, caplets, capsules, briquettes, bricks, blocks, cakes, and the like, provides a number of advantages over the prior art, including the compositions recently disclosed by Hince and Singer (Ser. No. 09/440,340 and Ser. No. 09/441,484). First, the sustained-release and coating agents enable a "time release" type of interaction between the compositions and the contaminated environmental media. Second, the sustained-release and coating agents allow the preferred forms of the compositions to remain more stable and to degrade more slowly when applied to an aqueous environment, which improves their function and simplifies the procedures required to effectively use the compositions to treat ground water and other contaminated waters and liquid wastes. The sustained-release and coating agents also provide for improvements in the storage and handling characteristics of the preferred forms of the compositions-e.g., reduced dusting and enhanced hardness and compaction. The sustained-release and coating agents would comprise from 0.001 to 50% of the compositions by weight or volume. Examples of the sustained-release and coating agents which would be used in the preferred embodiments of the disclosed compositions include one or more of the following: microcrystalline cellulose, cellulose powder, sodium carboxymethyl cellulose (CMC), hydroxypropyl cellulose (HPC), hydroxypropyl methyl cellulose (HPMC), hydroxyethylcellulose (HEC), ethyl cellulose, cellulose nitrate, and other cellulosic materials; polyvinyl acetate, cellulose acetate, and other acetate-containing materials; modified starch and pregelled starch; karaya gum, guar gum, locust-bean gum, and other plant- and animal-derived gums and other gel-forming materials.

Hence, as described above, the solid-chemical compositions of the present invention and the preferred embodiments thereof provide a number of subtle and important improvements relative to the prior art including the solid-chemical compositions recently disclosed by Hince (Ser. No. 09/439698, filed Nov. 15, 1999), Hince and Singer (Ser. No. 09/1440340, filed Nov. 15, 1999), and Hince and Singer (Ser. No. 09/441484, filed Nov. 17, 1999) with respect to promoting the more rapid and effective biodegradation, biotransformation, and/or detoxification of recalcitrant environmental contaminants.

In the practice of the preferred embodiment of the present invention, the components of the solid-chemical compositions disclosed herein would first be prepared and combined, after which they would be processed into the forms of pellets, tablets, caplets, capsules, briquettes, bricks, blocks, cakes and other similar forms prior to their use at a contaminated site. The components and/or forms of the compositions may be further treated or processed during the manufacturing process to control and optimize the disclosed time-dependent rates of disintegration, disaggregation, dispersal, and dissolution of the aforementioned preferred forms of the compositions and the rates of biodegradation, biological and biogeochemical conversion of the components of the compositions. Finally, the finished, preferred forms of the solid-chemical compositions would be applied to contaminated environmental media and wastes, including but not limited to contaminated sediments, sludges, solid and/or liquid wastes, and contaminated soils or waters, to promote the anaerobic biodegradation, transformation, or detoxification of the contaminants within such media.

A basic but important advantage of the pellet, tablet, capsule, briquette, cake, or other similar forms of the solid-chemical compositions disclosed herein is that the disclosed compositions are easier to store, handle, and use than other chemical compositions for environmental-remediation disclosed in the prior art. Examples of such "generic" yet important advantages of the present invention relative to the prior art include but are not limited to: increased speed and effectiveness of the handling and use of the compositions via the use of a wide variety of mechanical means such as conveyors, hoppers, augers, eductors, spreaders, vibratory-feed systems, soil-mixing systems, and the like; drastic reductions in dusts and other fugitive emissions produced by the handling or use of the composition, thereby reducing the health and safety concerns of workers and the public; and dramatically improved resistance to unwanted movement, dispersal, and displacement of the compositions due to environmental conditions such as wind, water currents, and the like.

Another advantage of the compositions disclosed herein is that they can easily be used within so-called "permeable reactive barriers" (PRBs), which are increasingly being utilized for subsurface ground-water remediation applications and the like. Similarly, the advantages of the present invention can also be applied to above-ground biological-treatment systems, such as fluidized-bed reactors and bio-filter systems, to treat contaminated ground-water, wastewater streams, industrial-process water streams, and the like. The preferred embodiments of the preferred forms of the disclosed compositions which include one or more sustained-release and coating agents are particularly well suited for these applications.

As described above, the novel solid-chemical compositions disclosed herein provide unique advantages for achieving the relatively rapid and effective bioremediation of recalcitrant organic and inorganic contaminants present in wastes, soils, waters, or sediments. The present invention overcomes many of the disadvantages associated with traditional remediation methods by providing means for the efficient and cost-effective remediation of environmental contaminants on a commercial scale with minimal disturbance to the contaminated environment.

EXAMPLES

The following examples are provided to illustrate the technical basis, merits and unique advantages provided. by the present invention. These examples are not to be construed as limiting the present invention in any way, but are merely presented as examples of the unique advantages and non-obvious improvements of the present invention over the prior art and to illustrate the practice of the present invention as described in the appended claims.

Example 1

A set of water-column tests were conducted on Nov. 3, 1999 to evaluate the rates of disintegration and disaggregation of several pelletized chemical compositions prepared in accordance with both the present invention and those previously disclosed by Hince and Singer (Ser. No. 09/440,340, filed Nov. 15, 1999 and Ser. No. 09/441,484, filed Nov. 17, 1999). The disintegration tests involved the immersion of 2-to-3 pellets of each composition in approximately 6 ounces of water within glass vessels. The pellets used from each composition were relatively uniform, each being ¼-inch in diameter and approximately 1.25 cm (0.6 inches) long.

FIG. 1 shows the effects of varying both the formulation and manufacturing criteria on the disintegration and disaggregation rates of the various pelletized compositions. As shown on FIG. 1, the time :required for the complete disintegration of the various pelletized compositions in water ranged from 60 minutes to more than 240 minutes. Based on the comparison of these results to the pellet-manufacturing data, the disintegration rates appeared to be most strongly correlated to the hardness and degree of compaction of the pellets produced, which was a function of both the formulation and means of manufacture of the pelletized compositions. Subsequent tests and further evaluation of pellet-manufacturing processes and criteria indicate that a much broader range of pellet-disintegration times can be achieved according to the means and methods of the present invention disclosed herein.

Example 2

An initial set of settling-velocity tests were conducted in a water-column on Nov. 5, 1999 to evaluate the settling rates of the same pelletized chemical compositions described in EXAMPLE 1. The settling tests were conducted in a 3-in. diameter Lexan tube containing a 29 cm (11.4 in.) water column. Relatively uniform pellets were tested from each composition, with each pellet being ¼-inch in diameter and 1.25 cm (0.6 in.) long. A minimum of five time trials were conducted for each composition. The settling velocity for each time trial was computed by dividing the height of the water column (29 cm; 11.4 in.) by the total time required for the pellet to reach the bottom of the column. Given that the water-column used was only 29 cm (11.4 in.) in thickness, the data likely reflect conservatively low estimates of the pellet settling velocities as it is unlikely that the pellets reached their terminal velocities in the water column.

Figure 2:
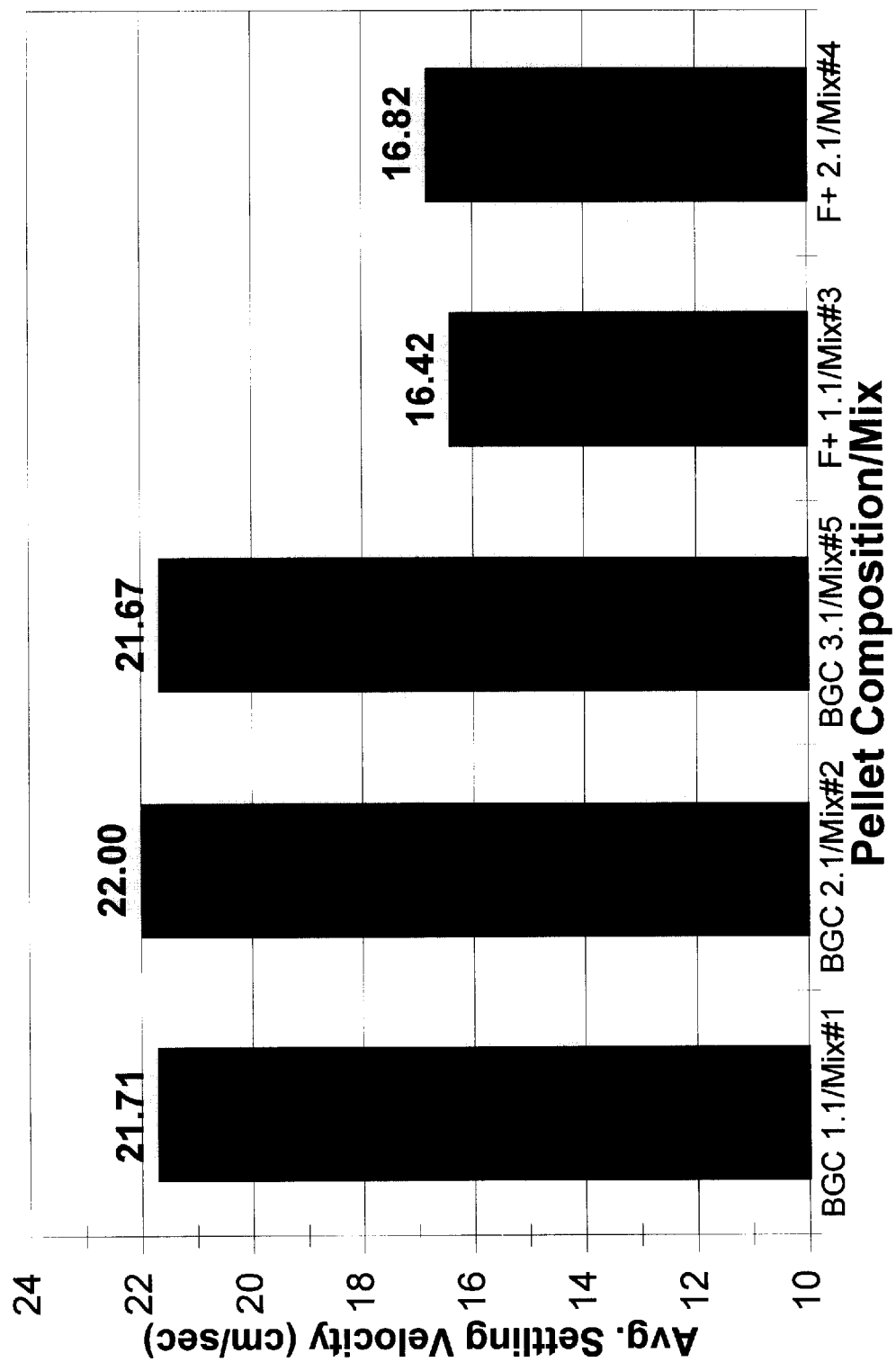
FIG. 2 shows the effects of both varying composition and manufacturing criteria on the settling velocities of pelletized forms of chemical compositions prepared in accordance with both the present invention and those previously disclosed by Hince and Singer (Ser. No. 09/440,340, filed Nov. 15, 1999 and Ser. No. 09/441,484, filed Nov. 17, 1999).
Figure 3:
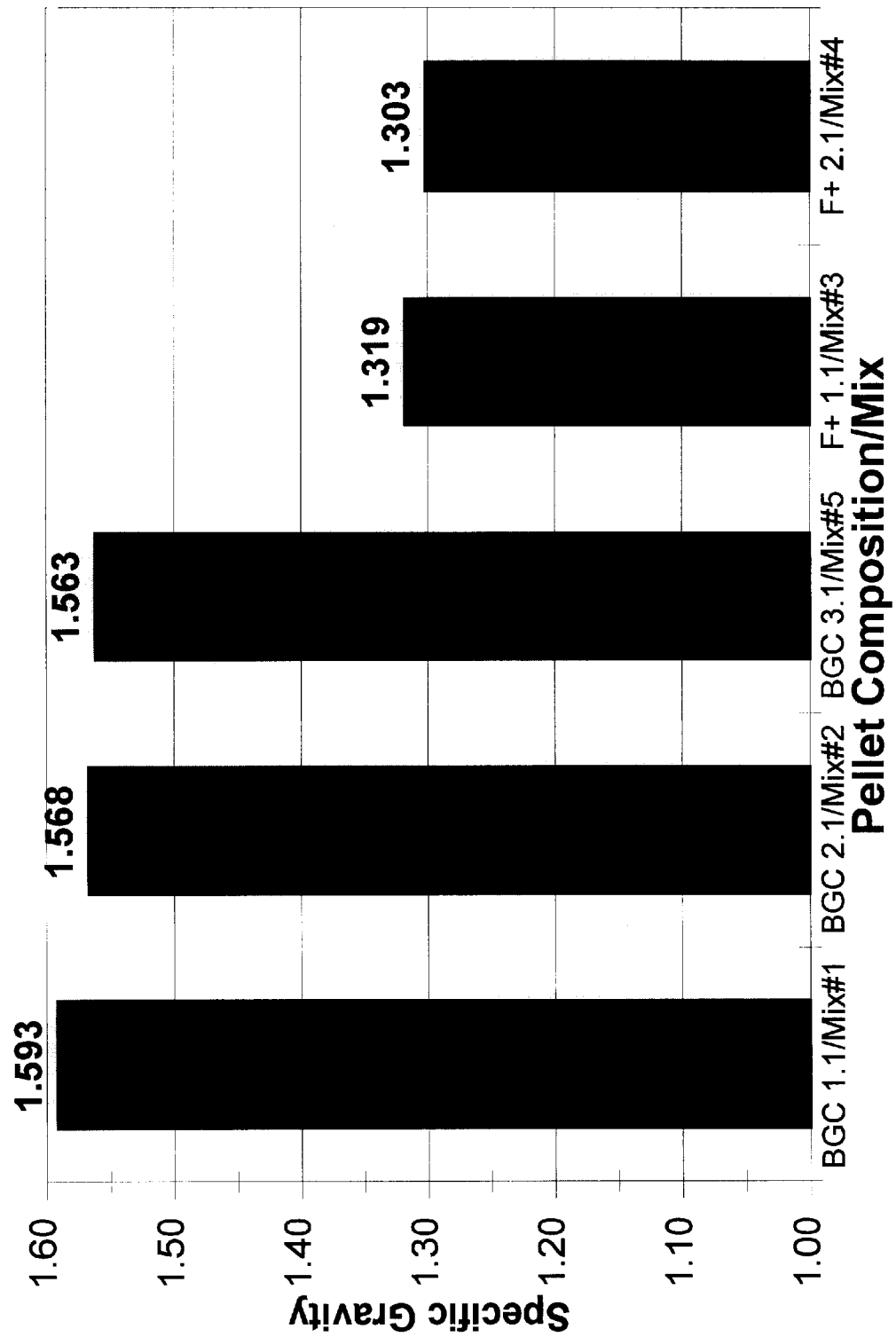
FIG. 3 shows the calculated values of the weighted-average specific gravity of the pelletized forms of several different chemical compositions prepared in accordance with both the present invention and those previously disclosed by Hince and Singer (Ser. No. 09/440,340, filed Nov. 15, 1999 and Ser. No. 09/441,484, filed Nov. 17, 1999).

FIG. 2 illustrates the data from the Nov. 5, 1999 settling-velocity tests. FIG. 3 illustrates the specific gravity calculated for each pelletized composition based on the known formulation of each composition. FIG. 3 indicates that the three compositions which included inorganic minerals and metallic media, i.e., the compositions designated "BGC 1.1/Mix#1," "BGC 2.1/Mix#2," and "BGC 3.1/Mix#5," had the highest specific gravities. Comparison of FIG. 2 with FIG. 3, indicates that these heavier compositions also had the fastest settling velocities, as expected. Noteworthy is that the hardest and most compact pelletized composition, "BGC: 2.1/Mix#2," had the highest settling velocity overall, despite the fact that it had a slightly lower specific gravity than the composition designated "BGC 1.1/Mix#1." As shown in FIG. 1, the pelletized composition "BGC 2.1/Mix #2" also had the longest disintegration time of the compositions tested. Overall, these observations indicate that the settling velocity of the pellets was not only a function of their specific gravity, but of their relative compaction, hardness, and surface-friction (i.e., the "smoothness" of the pellet surfaces) as well. Hence, the settling velocity of the pelletized compositions can be varied as a function of specific gravity (i.e., the formulation of the composition), hardness, compaction, smoothness, and other related parameters. Subsequent studies and further evaluation of pellet-manufacturing processes and criteria indicate that the settling velocity can be reliably controlled as a function of the means and methods of the present invention disclosed herein.

Example 3

An additional set of settling-velocity tests was conducted on Nov. 18, 1999 using the same experimental equipment and conditions as described in EXAMPLE 2 above. These tests evaluated the settling velocities of the same or similar pelletized compositions whereby pellets of uniform length (1.25 cm; 0.6 in.) and differing diameters were used-i.e., ¼ inch, 3/16-in., and 5/32-in ., respectively. A minimum of ten time trials were conducted for pellets from each size class. The settling velocity for each time trial was computed by dividing the height of the water column (29 cm; 11.4 in.) by the total time required for the pellet to reach the bottom of the column. As noted above, the settling-velocity data are likely to underestimate the maximum potential velocities as it is unlikely that the pellets reached their terminal velocities within the 29-cm (11.4 in.) water column.

Figure 4:
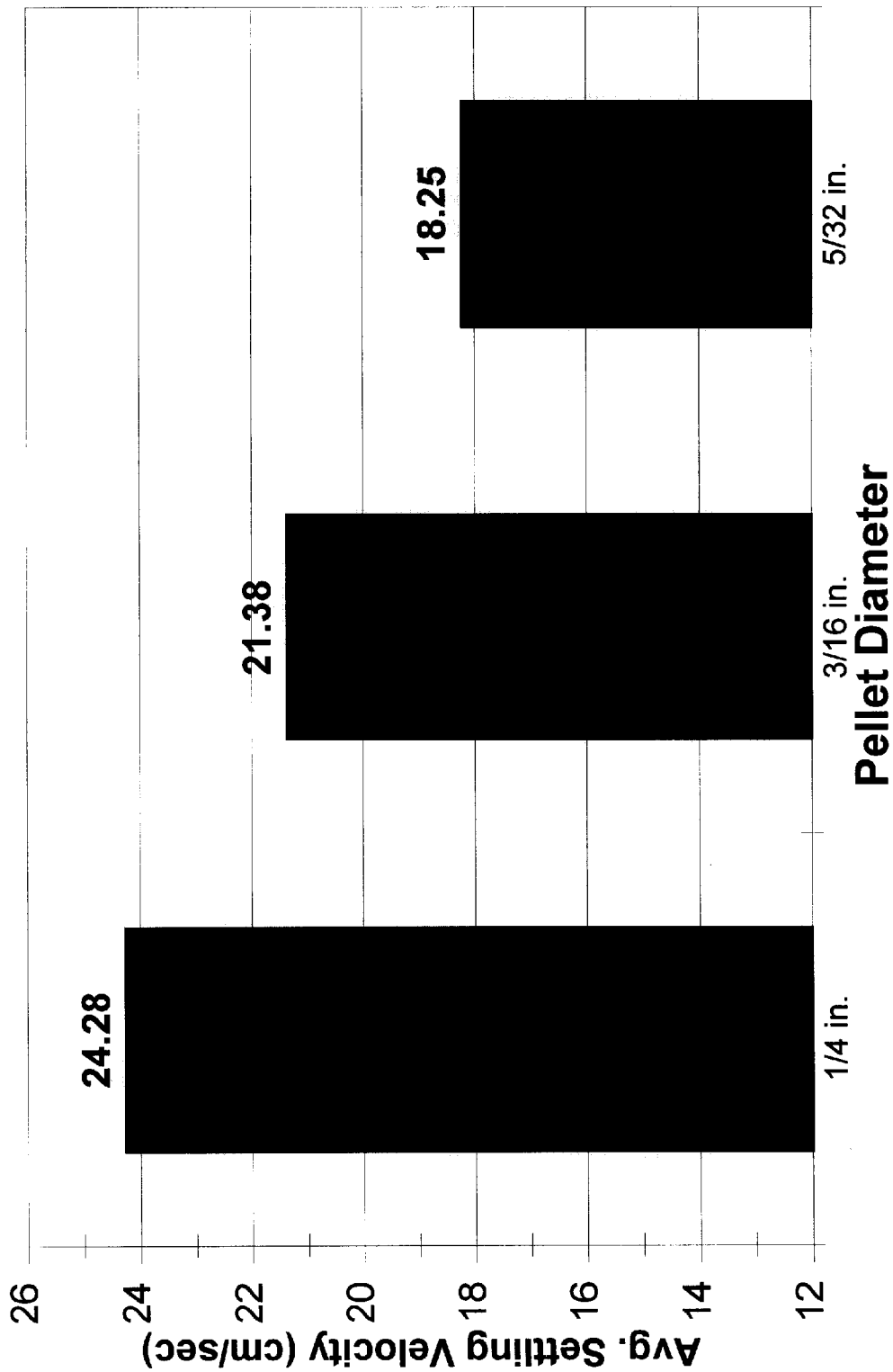
FIG. 4 shows the effects of varying size on the settling velocities of pelletized forms of a chemical composition prepared in accordance with both the present invention and Hince and Singer (Ser. No. 09/441,484, filed Nov. 17, 1999).

As shown on FIG. 4, the settling velocity of the pellets directly correlates with their size in accordance with Stokes Law, with velocities ranging from 18.25 cm/sec (7.19 in/sec) for the smallest pellets to 24.8 cm/sec (9.77 in/sec) for the largest pellets. Hence, these data reflect that the settling velocities of the pelletized compositions can easily be varied as a function of the size. Subsequent studies and further evaluation of pellet-manufacturing processes and criteria indicate that the settling velocity can be reliably controlled as a function of the means and methods of the present invention disclosed herein.

Example 4

On Nov. 11–12, 1999, a field test was conducted at a site contaminated with the extremely recalcitrant pesticides DDT and toxaphene using a pelletized form of a solid-chemical composition prepared in accordance with both the means and methods of the present invention and the solid-chemical composition previously disclosed by Hince and Singer (Ser. No. 09/441,484, filed Nov. 17, 1999). Previous field tests which involved the powdered form (or forms) of similar, solid-chemical compositions consistent with that previously disclosed by Hince and Singer (Ser. No. 09/441, 484) were conducted in June and September of 1999.

The solid-chemical composition pellets used in the Nov. 11–12, 1999 field trial were ¼ inch in diameter and varied from less than ⅛ of an inch to more than ½ inch in length. Based on the formulation of the solid-chemical composition contained in these pellets alone, the specific gravity of the pellets was estimated to be greater than 1.56. The average settling velocity was previously determined to be on the order of 21.67 cm/sec (8.53 in/sec) based on the tests described in EXAMPLE 2 above. The field trial involved spreading the pellets over the pesticide-contaminated soil layer within a 10-ft×10-ft. test plot, after which the pellets were mixed into the soils with a standard hand-operated rototiller. After the pellets were first tilled into the test plot, the plot was wetted with water and allowed to "incubate" overnight. Subsequently, the test plot was tilled a second time the following day in a successful attempt to evenly distribute the chemical composition throughout the contaminated soils.

Based on the field observations from the Nov. 11–12, 1999 field test, the pellets were found to be greatly superior to the powdered forms of the compositions used in the June and September 1999 field trials. First, in comparison to both of the earlier field trials, the pelletized compositions used in the Nov. 11–12, 1999 field trial were found to be much easier to handle, distribute, and mix into the soils than the powdered compositions. In both the June and September trials, the handling, distribution, and mixing of the powdered compositions was complicated by changing wind conditions, which resulted in significant dust production and difficulties in evenly distributing the compositions in the areas of interest. By comparison, the handling and use of the pelletized composition was completely unaffected by the wind, and the dense pellets were easily and evenly distributed throughout the soils in the test plot. Moreover, it was found that the use of the pelletized compositions enabled a much more thorough and homogenous mix to be produced with the contaminated soils relative to the powdered forms of the compositions.

Example 5

A qualitative water-column test was conducted using the pelletized form of the composition designated "BGC 3.1/ Mix#5" from 8 to 24 November 1999. A Lexan vessel and water column similar to that described in EXAMPLES 1–3 were also used in this study. The primary objective of this qualitative column study was to document changes in the dissolved oxygen (DO), Eh (i.e, redox potential), and pH conditions in the water column over time as a function of the disintegration, disaggregation, dispersal, and dissolution of the pellets and the biodegradation and biological and biogeochemical conversion of the components of the pelletized composition. In addition, visual observations were made to provide insight as to the nature of the biogeochemical reactions occurring in the column over time.

Figure 5:
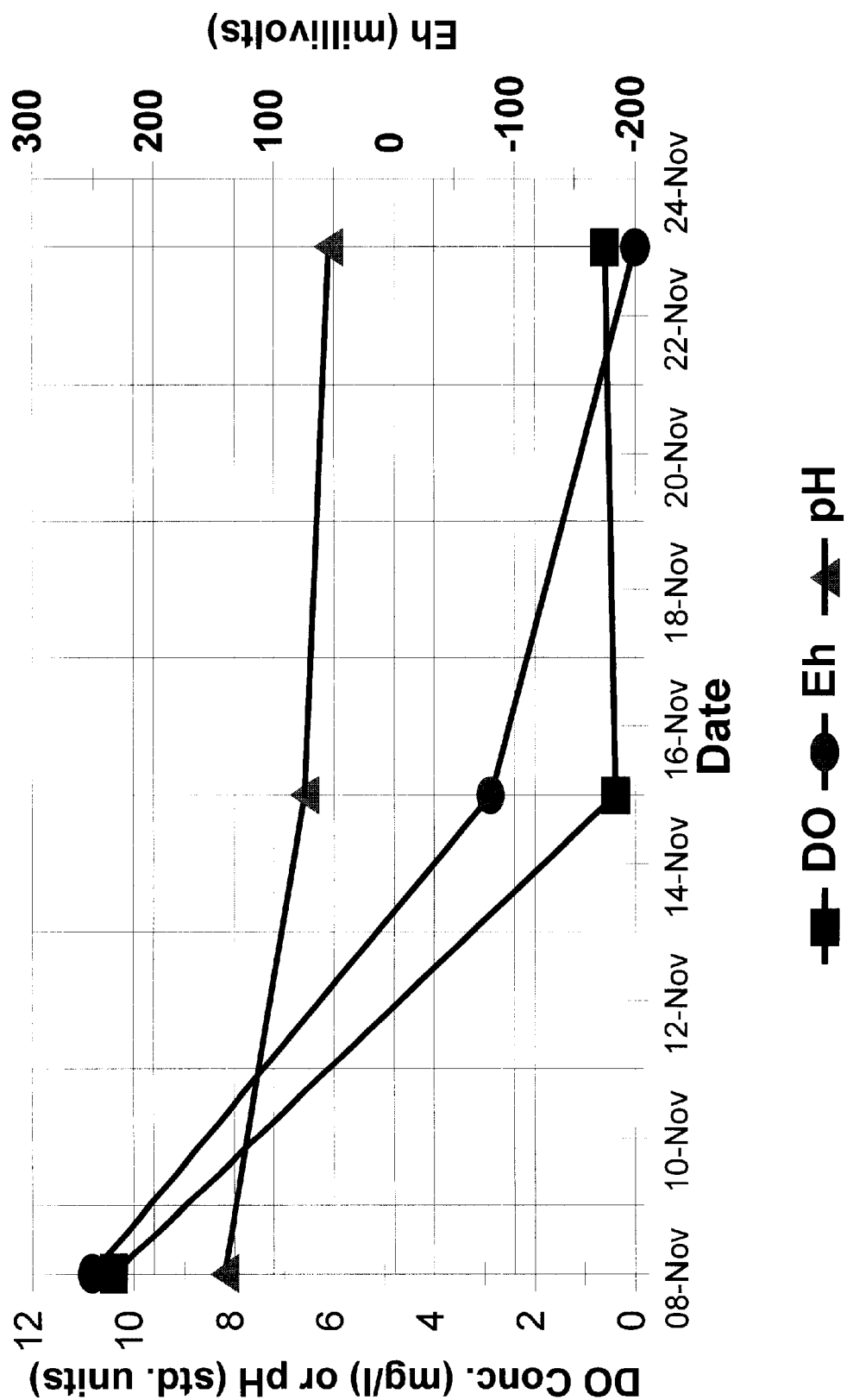
FIG. 5 shows the effects of the disintegration, biodegradation, and biological conversion of a pelletized chemical composition prepared in accordance with both the present invention and Hince and Singer (Ser. No. 09/441,484, filed Nov. 17, 1999) on the dissolved oxygen (DO), Eh, and pH conditions in a water column over time.

FIG. 5 illustrates changes in the DO, Eh, and pH conditions in the water column over the course of the study. As shown in FIG. 5, a rapid decline in DO concentrations and Eh values occurred in the water column. DO levels in the column dropped from 10.4 mg/l to 0.4 mg/l in one week, whereas Eh values went from 251.1 millivolts to −80.3 millivolts during this period. During the first few days of the experiment, significant carbon-dioxide production was observed which indicated the initial dominance of denitrification processes in the column. Within four days, carbon dioxide production ceased whereas the production of carbonates was observed, which was indicative of a shift to biologically mediated iron-reduction processes. The DO, Eh, and pH values measured on Nov. 15, 1999, as well as the declining trends in each of these parameters, were consistent with the visual observations which indicated a shift from denitrification to iron-reduction as the dominant biogeochemical process in the column. As of Nov. 23, 1999, a shift from iron-reduction to sulfur-reduction was observed. First, sulfide odors and a blackish discoloration of the water column were observed consistent with the reduction of sulfur and the production of sulfide species. As of 23 Nov. 1999, Eh levels were observed to drop to −199.6 millivolts, consistent with conditions which favor sulfur-reduction, methanogenic, and water hydrolysis-hydrogenation processes.

The combined observations of this study indicate that the pelletized composition prepared in accordance with the present invention was effectively able to achieve "redox cycling" in the water column-i.e., the present invention was able to force the biogeochemical processes in the column to "cycle" from the relatively high-energy biogeochemical process of denitrification successively through the lower-energy processes of iron-reduction and sulfur-reduction.

The invention has been described with reference to particular embodiments. However, it should be obvious to those skilled in the art to which this invention pertains that other modifications and enhancements can be made without departing from the scope of the claims that follow.

What is claimed is:

1. A method for the in-situ anaerobic bioremediation of chemical contaminants in sediments present in underwater and aqueous environments, said environments being natural or manmade, comprising the following steps and conditions:

a. applying a dense solid-chemical composition to said aqueous environments; whereby b. said composition comprises a mixture of (i) particles of biodegradable organic materials; (ii) particles of inorganic materials and (iii) a disintegrant;

c. said composition is prepared and applied in one or more forms selected from the group consisting of briquettes, granules, pellets, blocks and tablets;

d. said forms of said chemical composition have a specific gravity that is greater than 1.2;

e. said forms of said composition are applied in such manner so as to sink into said sediments under the influence of their own settling velocities;

f. said forms of said composition subsequently disintegrate and expose the particulate materials contained therein;

g. said composition serves to increase the bioavailability and biogeochemical reactivity of said chemical contaminants present in said sediments;

h. said composition serves to create, enhance and maintain anaerobic and reducing conditions in said sediments which promote the anaerobic biodegradation of said contaminants.

2. A method in accordance with claim 1 which further promotes the chemical reduction of said contaminants.

3. A method in accordance with claim 1 which further promotes the biologically mediated chemical reduction of said contaminants.

4. A method in accordance with claim 1 which further promotes the biological or chemical detoxification of said contaminants.

5. A method in accordance with claim 1 which further promotes the biological or chemical transformation of said contaminants to less recalcitrant forms.

* * * * *